Aug. 20, 1935. C. F. ARNOLD ET AL 2,011,840
RAINPROOF COWL VENTILATOR
Filed April 5, 1933
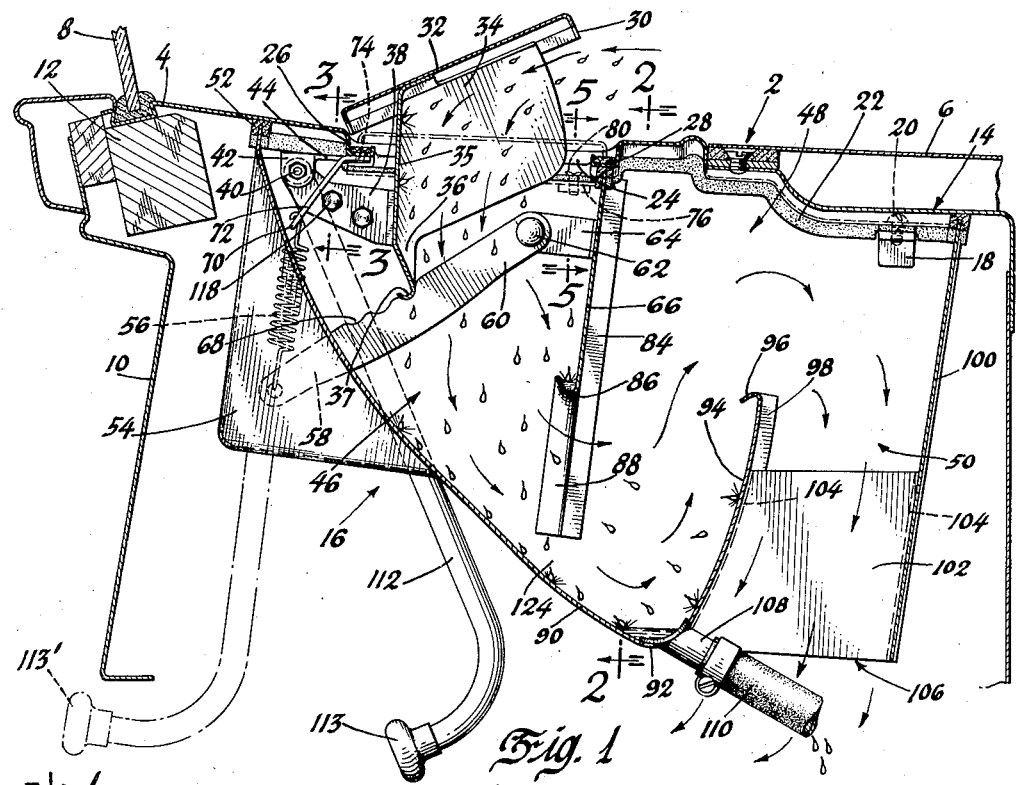
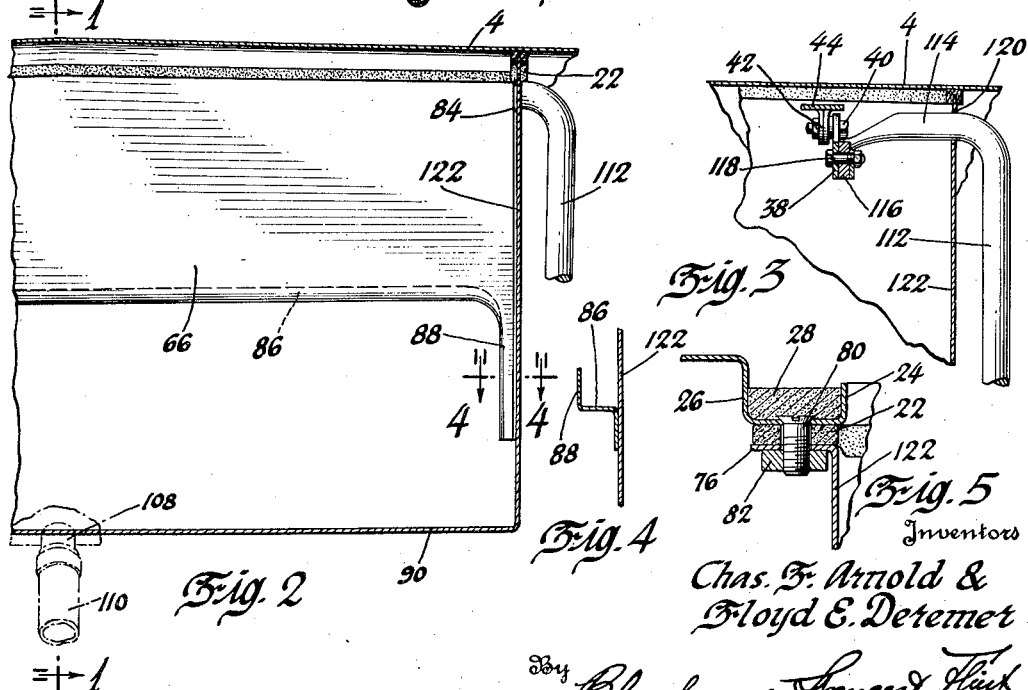

Patented Aug. 20, 1935

2,011,840

UNITED STATES PATENT OFFICE 2,011,840

RAINPROOF COWL VENTILATOR

Charles F. Arnold and Floyd E. Deremer, Detroit, Mich., assignors to General Motors Corporation, Detroit, Mich., a corporation of Delaware Application April 5, 1933, Serial No. 664,470

10 Claims. (Cl. 98—2)

This invention relates to ventilators applied to the cowls of automotive vehicles.

The particular object of the invention is to incorporate with the ventilator a series of baffles which effectively will catch rain and prevent water from entering the passenger compartment but at the same time will allow air freely to enter the ventilator and pass to the interior of the vehicle.

The object of the invention is accomplished by providing staggered baffles, the ends or edges of which are provided with hook-shaped flanges. The water entering the cowl ventilator strikes the baffles and is prevented from passing through the ventilator by the hook-shaped flanges. The retained water will flow to the ventilator bottom or floor from where it is conducted by a suitable pipe to a point outside the vehicle.

On the drawing

Figure 1 is a sectional view through the cowl of an automotive vehicle showing the improved ventilator applied.

Figure 2 is a section on the line 2—2 of Figure 1.

Figure 3 is a section on the line 3—3 of Figure 1.

Figure 4 is a section on the line 4—4 of Figure 2.

Figure 5 is a section on the line 5—5 of Figure 1.

Referring to the drawing, the numeral 2 indicates an automotive vehicle as a whole. The vehicle includes the usual cowl 4, hood 6 which covers the engine and encloses the engine compartment, windshield 8 and instrument board 10. A transverse cowl bar, indicated at 12, supports the windshield at its lower portion. The cowl 4 is countersunk at its front portion as indicated at 14, the countersunk portion being overlapped by the hood 6.

The ventilator of the invention is constructed as a unit and applied to the cowl and is indicated as a whole by the numeral 16. It is in the form of a channel and is mounted under the cowl and secured thereto at various places throughout its extent. One means for securing the ventilator inside the cowl is indicated at 18 and comprises an angular bracket spot welded on one of its angles to the side of the ventilator and at its other angle there is a screw 20 which passes through the reduced portion 14 of the cowl and through a flange on the upper part of the ventilator rigidly to hold the parts together. A soft rubber or other packing 22 is positioned between the cowl and the ventilator to make the parts rattle proof and to form a tight joint. As many of these brackets as desired may be used.

The cowl 4 is provided with an opening 24 having its edge formed into a channel shaped flange 26 as is best shown in Figure 5. A suitable piece of rubber or other packing 28 fills the channel 26 in order to form a tight joint with the flanged edge 30 of a deck or cover 32 which closes the opening 24 when no ventilation is desired.

Secured to the underside of the deck or cover 32 is the scoop 34 which extends downwardly into the opening 24 into the interior of the cowl. The back 35 of the scoop has an extension 36 the end of which is bent and shown at 37 the purpose of which will be later described. An arm 38 is rigidly secured to the back 35 of the scoop and has an eye at its rear end to receive a bolt 40 (Figure 3) to form a pivot for the door. The bolt 40 is mounted in a bracket 42 having an integral arm 44 extending forwardly and being secured to the channel 26 at the edge of the cowl opening.

The general shape of the ventilator 16 under the hood is in the form of a channel having the compartments 46, 48 and 50. The compartment 46 is the rearwardmost portion of the channel and has secured to its upper edge a soft rubber or other sound deadening member 52 and is tightly secured to the under side of the cowl. The bottom of the channel and compartment 46 generally slants at an angle of substantially 60° to the vertical and has a rearwardly projecting pocket 54 at its mid portion. The purpose of the pocket 54 is to receive the spring 56 and the end 58 of a bar 60 pivoted at 62 to a bracket 64 secured to the rearwardmost baffle 66. The bar 60 has a plurality of notches 68 at its upper portion in which there is received the rounded end 37 of the projection 36. The upper end of the spring 56 is attached at 70 to an arm 72 secured at its upper end by a rivet 74 to the flange 26 at the edge of the cowl opening. The spring 56 constantly urges the bar 58 upwardly and upholds the cover 32 in any desired position, depending upon which notch 68 is engaged by the projection 36.

The sides 122 are secured to the channel 26 at the edge of the cowl opening in the manner shown in Figure 5. Each side 122 has an angularly bent finger or flange 76 which extends under the channel 26. The fabric or rubber filler 22 is positioned between the flange 76 and the channel 26 and suitable screws 80 screw into a nut 82 rigidly to hold the parts together.

The baffle 66 is provided with the side flanges 84 which are spot welded or otherwise secured to the sides of the ventilator. The baffle 66 is provided at its lowermost end with the return bent or hook-shaped flange 86, the purpose of which is to catch water as it strikes the baffle and flows downward. The baffle 66 has its sides continued downwardly as is indicated at 88 in Figure 2, the channel 86 continuing down the extending side portion 88. Any rain or water which is caught on the baffle 66 or in the channel 86 will flow to the bottom 90 of the ventilator as is best shown at 124 in Figures 1 and 2.

The bottom of the ventilator terminates at 92 which is substantially at the dividing line of the compartments 48 and 50. At this point a second baffle 94 extends upwardly and has at its upper edge a flange 96 formed into a more or less hook-shape for the purpose of catching any water which strikes the baffle 94. If the hook-shaped flange 96 were not provided the rapidity of flow of the air stream would tend to carry along therewith any water which became deposited on the baffle 94. As the water collects in sufficient quantities under the flange 96 it will fall by gravity to the bottom 90 of the ventilator. The baffle 94 is provided with the flanges 98 at its sides by means of which it is secured to the sides of the ventilator.

A third baffle 100 extends downwardly from the top of the ventilator and considerably in advance of the upwardly extending baffle 94. The baffle 100 extends downwardly to the lowermost portion of the bottom 90 of the ventilator and is secured to and spaced from the baffle 94 by means of a spacer plate 102. The plate 102 is preferably flanged as indicated at 104 at its two sides and is secured by means of these flanges to the baffles 94 and 100. The rearward most baffle 100 also forms the end of the ventilator box or channel.

From the description and illustration of the baffles it is apparent that they extend toward each other alternately and will force the air to take a zig-zag path through the ventilator. The air finally leaves the ventilator at the opening 106 and is delivered to the vehicle body below the instrument board free of rain.

The lowermost portion of the bottom 90 at the point 92 is provided with an opening in which there is secured a fitting 108 which has a suitable hose or pipe 110 secured thereto and by means of which the trapped water is led to any suitable point outside the vehicle such as below the floor or toe board.

A suitable handle 112 having an operating knob 113 extends below the instrument board 10 and has its upper end bent at right angles as indicated at 114. The end of the portion 114 is flattened as indicated at 116 and is secured by means of the bolts and nuts 118 to the arm 38. A suitable opening 120 is provided in side 122 of the ventilator to allow the angle portion 114 to extend to the compartment 46 to be attached to the arm 38. By referring to Figure 1, the dotted line portion 113' of the handle shows the position it occupies when the deck or cover 32 is in its lowermost position and with the end 37 of the projection 36 resting in the notch 68 farthest to the left. The full line position shows the position of the parts when the cover 32 is fully opened. To close the cover, the handle 113 is pulled rearwardly from the full line to the dotted line position.

The operation of the ventilator and the manner in which it entraps the rain is as follows: Assuming that the vehicle is in motion and the ventilator open as shown in Figure 1, the air and entrained rain will enter the opening 24 as indicated by the arrows. The rain drops are indicated schematically, some of which will strike against the scoop 34 and drop from the bottom edges thereof falling into the compartment 46 at the rear. Other rain drops will fall directly to the bottom 90 while still others will strike the baffle 66 and be caught thereby to flow to the bottom into the hook-shaped flange 86 from where the water will flow as indicated at 124 onto the bottom 90 of the ventilator. Still other rain drops will pass beneath the flange 86 and into the compartment 48 where the air stream will carry them against the baffle 94 where they will be retained. If no flange 96 were provided at the top of the baffle 94 the air stream would tend to carry the water up the baffle and over the top edge and into the compartment 50. Any water which is forced up the baffle 94 by the air stream will be caught by the flange 96 and when the water is sufficiently heavy it will roll down the baffle 94 to the bottom of the ventilator. All the water reaching the bottom of the ventilator will eventually find its way to the fitting 108 and will flow to the pipe 110 and outside the vehicle.

The drawing shows the deck or cover 32 swinging to open from the front on the bolt 40 placed at the rear of the opening 24. It is equally within the scope of the invention for the cover to swing so as to open from the rear in which event the bolt 40 will be positioned at the front of the opening 24.

We claim:

1. In a ventilator applied to the cowl of an automotive vehicle, said cowl having an opening, a cover or deck movable to open and closed position over the opening, a channel secured in the cowl under the opening and adapted to direct the air stream entering the opening, a plurality of rigid downwardly extending baffles in the channel, and means extending between the downwardly extending baffles to direct the air stream.

2. In a ventilator applied to the cowl of an automotive vehicle, said cowl having an opening, a cover or deck movable to open and closed position over the opening, a channel secured in the cowl under the opening and adapted to direct the air stream entering the opening, a rigid downwardly extending baffle in said channel adjacent the opening to direct the air stream, a water flange on said baffle to catch water entering the opening, and upwardly extending baffle in said channel beyond and spaced from the said downwardly extending baffle, a water flange on said baffle to catch water entering said opening and passing said downwardly extending baffle, and means to direct the water outside the vehicle.

3. In a ventilator applied to the cowl of an automotive vehicle, said cowl having an opening, a cover or deck movable to open and closed position over the opening, a channel secured in the cowl under the opening and adapted to direct the air stream entering the opening, a rigid downwardly extending baffle in said channel adjacent the opening to direct the air stream, a water flange on said baffle to catch water entering the opening, an upwardly extending baffle in said channel beyond and spaced from the said downwardly extending baffle, a water flange on said baffle to catch water entering said opening and passing said downwardly extending baffle, means to direct the water outside the vehicle, and a third baffle extending downwardly in said channel beyond said upwardly extending baffle.

4. In a ventilator applied to the cowl of an automotive vehicle, said cowl having an opening, a cover or deck movable to open and closed position over the opening, a channel secured in the cowl under the opening and adapted to direct the air stream entering the opening, a plurality of rigidly downwardly extending baffles in the channel, one of said baffles having a flange to catch water entering the opening.

5. In a ventilator applied to the cowl of an automotive vehicle, said cowl having an opening, a cover or deck movable to open and closed position over the opening, a channel secured in the cowl under the opening and adapted to direct the air stream entering the opening, a plurality of rigidly downwardly extending baffles in the channel, means extending between the downwardly extending baffles to direct the air stream, and a flange on said means to catch water entering the opening.

6. In a ventilator applied to the cowl of an automotive vehicle, said cowl having an opening, a cover or deck movable to open and closed position over the opening, a channel secured in the cowl under the opening and adapted to direct the air stream entering the opening, a rigid downwardly extending baffle in said channel adjacent the opening to direct the air stream, a reversely bent or hook-shaped water flange on said baffle to catch water entering the opening, an upwardly extending baffle in said channel beyond and spaced from said downwardly extending baffle, a reversely bent or hook-shaped water flange on said baffle to catch water entering said opening and passing said downwardly extending baffle, and means to direct the water outside the vehicle.

7. In a ventilator applied to the cowl of an automotive vehicle, said cowl having an opening, a channel under the opening to direct the air stream, means within the channel to give the air stream a tortuous path therethrough a cover over said opening, an arm rigidly connected with the cover and pivotally mounted inside the channel to form a pivot for the cover, a projecting member rigid with said cover, an arm pivoted inside the channel, said arm having a plurality of notches, a spring urging said arm against said projection, said projection adapted to engage in any of said notches to hold the cover in a given position, and means to operate the cover to cause it to swing on its pivot.

8. In a ventilator applied to the cowl of automotive vehicles, said cowl having an opening, a channel under the opening to direct the air stream, a cover over said opening, an arm rigidly connected with the cover and pivotally mounted inside the channel, a projecting member rigid with said cover, an arm pivoted inside the channel, said arm having a plurality of notches, a pocket in the channel into which the free end of the arm extends, a spring in said pocket urging said arm against said projection, said projection adapted to engage in any of said notches to hold the cover in a given position, and means to operate the cover to cause it to swing on its pivot.

9. In a ventilator applied to the cowl of an automotive vehicle, said cowl having an opening, a cover or deck movable to open and closed position over the opening, a channel secured in the cowl under the opening and adapted to direct the air stream entering the opening forwardly of the vehicle, and a plurality of air directing baffles in the channel to give the air a tortuous passage therethrough, one of said baffles having a flange to catch water entering the opening.

10. In a ventilator applied to the cowl of an automotive vehicle, said cowl having an opening, a cover or deck movable to open and closed position over the opening, a channel secured in the cowl under the opening and adapted to direct the air stream entering the opening forwardly of the vehicle, and means within the channel to give the air stream a tortuous passage comprising a plurality of vertical baffles extending from opposite sides of the channel.

CHARLES F. ARNOLD.
FLOYD E. DEREMER.